US012745877B2

(12) United States Patent
Widanagamage Don et al.

(10) Patent No.: US 12,745,877 B2
(45) Date of Patent: Sep. 29, 2026

(54) FOOD PROCESSING DEVICE

(71) Applicant: BREVILLE PTY LIMITED, Alexandria (AU)

(72) Inventors: Lochana Subasekara Widanagamage Don, Alexandria (AU); Con Psarologos, Alexandria (AU); Rey Anthony Carullo, Alexandria (AU); Ze Kang Lai, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 497 days.

(21) Appl. No.: 18/264,009

(22) PCT Filed: Feb. 3, 2022

(86) PCT No.: PCT/AU2022/050056
§ 371 (c)(1),
(2) Date: Aug. 2, 2023

(87) PCT Pub. No.: WO2022/165552
PCT Pub. Date: Aug. 11, 2022

(65) Prior Publication Data

US 2024/0023759 A1 Jan. 25, 2024

(30) Foreign Application Priority Data

Feb. 3, 2021 (AU) ................................ 2021900238

(51) Int. Cl.
*A47J 43/00* (2006.01)
*A47J 43/07* (2006.01)

(52) U.S. Cl.
CPC ....... *A47J 43/0777* (2013.01); *A47J 43/0794* (2013.01)

(58) Field of Classification Search
CPC ................ A47J 43/0777; A47J 43/0794; A47J 43/0761; A47J 43/0783; A47J 43/0772
See application file for complete search history.

(56) References Cited

U.S. PATENT DOCUMENTS

2005/0056160 A1* 3/2005 Mulle ................ A47J 43/0788 99/492
2016/0120370 A1* 5/2016 Starflinger .......... A47J 43/0777 366/314

(Continued)

FOREIGN PATENT DOCUMENTS

CN 105572756 A 5/2016
CN 209202930 U 8/2019

(Continued)

OTHER PUBLICATIONS

EESR for EP application No. 22748736.01, dated Nov. 22, 2024, 9 pages.

(Continued)

*Primary Examiner* — Anshu Bhatia
(74) *Attorney, Agent, or Firm* — Renner, Otto, Boisselle & Sklar, LLP; Christopher P Harris

(57) ABSTRACT

A food processing device including: a base having a drive motor; a vessel removably mounted on the base and including a bottom wall, a side wall extending upwardly from the bottom wall to a cover member, the cover member including a feed tube extending upwardly therefrom; a pusher member adapted to be slidably received in the feed tube; and an interlock system operatively associated with the drive motor to enable operation of the drive motor, the system including: a light transmitter and a light sensor, the transmitter being operable to provide a path of light that is receivable by the light sensor; a light channel having an input end portion associated with the light transmitter and an output end portion associated with the light sensor to allow the path of (Continued)

light to travel therethrough; and a light blocker located between the input and output end portions of the light channel, the light blocker being movable between: a closed position to block the path of light travelling through the light channel, and an open position to permit the path of light through the light channel such that the sensor receives the path of light, thereby enabling operation of the drive motor, wherein the light blocker is movable to the open position by engagement of the pusher member.

16 Claims, 14 Drawing Sheets

(56) References Cited

U.S. PATENT DOCUMENTS

| | | | | |
|---|---|---|---|---|
| 2016/0309960 | A1* | 10/2016 | Kolar .................. | A47J 43/0761 |
| 2019/0001287 | A1 | 1/2019 | Fleming | |

FOREIGN PATENT DOCUMENTS

| | | | |
|---|---|---|---|
| EP | 0046169 | A1 | 2/1982 |
| FR | 2791546 | A1 | 10/2000 |
| WO | 2020191437 | A1 | 10/2020 |

OTHER PUBLICATIONS

PCT International Search Report and Written Opinion, mailed Mar. 8, 2022, pp. 1-3.
Office Action for CN patent application No. 202280025269.8, dated Aug. 5, 2026, 9 pages.

* cited by examiner

FOOD PROCESSING DEVICE

RELATED APPLICATION

This application is a U.S. National Stage Application filed under 35 U.S.C. § 371 of PCT/AU2022/050056, filed Feb. 3, 2022, and entitled "FOOD PROCESSING DEVICE", which claims priority from Australian Patent Application No. 2021900238, filed on Feb. 3, 2021. The entire contents of each of the above-identified patent applications are incorporated herein by reference.

FIELD

The present invention relates to motorised food preparation appliances such as food processing devices.

The invention has been developed primarily for use with a food processing device and will be described hereinafter with reference to this application. However, it will be appreciated that the invention is not limited to this particular field of use.

BACKGROUND

Food processors perform a variety of food preparation operations such as chopping, slicing, dicing and julienning as well as mixing, stirring or liquifying food stuffs within a preparation vessel such as a bowl. The preparation vessels of such food processing devices are typically provided with a lid having a feed tube for safely inserting food into the vessel, and a pusher may also be provided to guide food that is inserted into the feed tube into the vessel. Such food processing devices typically include mechanical safety interlock devices that prevent or at least minimise injury caused by accidental or even intentional acts. In food processing devices with such safety devices, the internal blades of the food processor will not rotate unless the pusher is first inserted into the feed tube.

SUMMARY

It is an object of the present invention to substantially overcome, or at least ameliorate, one or more of the disadvantages of existing arrangements, or at least provide a useful alternative to existing arrangements.

There is disclosed herein a food processing device including:

- a base having a drive motor;
- a vessel removably mounted on the base and including a bottom wall, a side wall extending upwardly from the bottom wall to a cover member, the cover member including a feed tube extending upwardly therefrom;
- a pusher member adapted to be slidably received in the feed tube; and
- an interlock system operatively associated with the drive motor to enable operation of the drive motor, the system including:
  - a light transmitter and a light sensor, the transmitter being operable to provide a path of light that is receivable by the light sensor;
  - a light channel having an input end portion associated with the light transmitter and an output end portion associated with the light sensor to allow the path of light to travel therethrough,
  - a light blocker located between the input and output end portions of the light channel, the light blocker being movable between:
    - a closed position to block the path of light travelling through the light channel, and
    - an open position to permit the path of light through the light channel such that the sensor receives the path of light, thereby enabling operation of the drive motor, wherein the light blocker is movable to the open position by engagement of the pusher member.

Preferably, the light channel comprises:

- an input channel having a first end portion and a second end portion that is spaced from the first end portion, with the first end portion of the input channel providing the input end portion of the light channel; and
  - an output channel having a first end portion and a second end portion that is spaced from the first end portion of the output channel, with the first end portion of the output channel being disposed adjacent the second end portion of the input channel, and the second end portion of the output channel providing the output end portion of the light channel.

Preferably, the light blocker is located between the second end portion of the input channel and the first end portion of the output channel.

Preferably, the light blocker is biased towards the closed position such that the path of light between the light transmitter and the light sensor is blocked in a resting state of the interlock system.

Preferably, the food processing device further includes a microprocessor that is operatively associated with the light sensor and the motor, wherein the microprocessor sends a signal to enable operation of the motor upon the light sensor detecting the path of light.

Preferably, the cover member of the vessel comprises a lid that is removably coupled to a rim that is defined by the side wall of the vessel, with the rim surrounding a top opening of the vessel.

Preferably, the light transmitter and the light sensor are each located adjacent the bottom wall of the vessel when the vessel is mounted to the base.

Preferably, the light channel extends along the side wall of the vessel.

Preferably, the light channel extends along the side wall of the vessel and along a sidewall of the feed tube.

Preferably, the vessel includes a handle, and the light channel extends along the handle of the vessel.

The light transmitter and the light sensor may each be located on the base.

The light transmitter may alternatively be located on the vessel and the light sensor may be located on the base. Preferably, the light transmitter is inductively powered by an induction element located on the base.

The light blocker may be mounted to the feed tube.

The light blocker may alternatively be mounted to adjacent the cover member.

Preferably, the feed tube includes a longitudinal slot, and the pusher member includes a body and a rail portion that extends along the body in a longitudinal direction, wherein the rail portion is adapted to be received by the longitudinal slot of the feed tube, and wherein the light blocker is movable to the open position by engagement of the rail portion of the pusher member with the longitudinal slot of the feed tube.

There is also disclosed herein a food processing device including:

- a base having a drive motor;

a vessel removably mounted on the base and including a bottom wall, a side wall extending upwardly from the bottom wall to a cover member; and an interlock system operatively associated with the drive motor to enable operation of the drive motor, the system including:

a light transmitter and a light sensor, the transmitter being operable to provide a path of light that is receivable by the light sensor;

a light channel having an input end portion associated with the light transmitter and an output end portion associated with the light sensor to allow the path of light to travel therethrough; and a light blocker located between the input and output end portions of the light channel, the light blocker being movable between:

a closed position to block the path of light travelling through the light channel, and an open position to permit the path of light through the light channel such that the sensor receives the path of light, thereby enabling operation of the drive motor.

Preferably, the cover member comprises a lid that is removably coupled to a rim that is defined by the side wall of the vessel, with the rim surrounding a top opening of the vessel; and the light blocker is located mounted adjacent the lid and is movable to the open position by engagement of the lid with rim of the vessel.

Preferably, the light transmitter is located on the vessel and the light sensor is located on the base.

Preferably, the light transmitter is inductively powered by an induction element located on the base.

Alternatively, the light transmitter and the light sensor may each be located on the base.

Preferably, the cover member includes a feed tube extending upwardly therefrom, and the device further includes a pusher member adapted to be slidably received in the feed tube.

Preferably, the light channel comprises:

an input channel having a first end portion and a second end portion that is spaced from the first end portion, with the first end portion of the input channel providing the input end portion of the light channel; and an output channel having a first end portion and a second end portion that is spaced from the first end portion of the output channel, with the first end portion of the output channel being disposed adjacent the second end portion of the input channel, and the second end portion of the output channel providing the output end portion of the light channel.

Preferably, the light blocker is located between the second end portion of the input channel and the first end portion of the output channel.

Preferably, the light blocker is biased towards the closed position such that the path of light between the light transmitter and the light sensor is blocked in a resting state of the interlock system.

Preferably, the food processing device further includes a microprocessor that is operatively associated with the light sensor and the motor, wherein the microprocessor sends a signal to enable operation of the motor upon the sensor detecting the path of light.

Preferably, the light channel extends along the side wall of the vessel.

Preferably, the vessel includes a handle, and the light channel extends along the handle of the vessel.

In another aspect, there is provided a food processing device with a container and a lid, adapted to be mounted to a base with a motor for driving rotating blades in the container, and an interlock system to prevent operation of the motor, wherein the interlock system includes a light switch that is operational when the lid is fitted to the container.

In one embodiment, the lid has a feed chute through which foodstuff is delivered into the container and the light switch is triggered by a plunger pushing the foodstuff through the feed chute.

In one embodiment, the light switch includes a light blocker which is displaced by the plunger to open an optic circuit which allows activation of the motor.

In one embodiment, the light switch includes an actuator which is positioned adjacent the feed chute for engagement with the plunger, the actuator being coupled to the blocker to move the blocker out of the optic path when the plunger is pushed into the feed chute.

In one embodiment, the light switch is mounted in a side housing on the feed chute, the side housing having a slot facing into the feed chute for receiving an actuating rail of the plunger.

In one embodiment, the interlock system includes an input channel and an output channel to transmit light between the base of the food processor and the light switch, wherein the light switch includes a mirror element to reflect light from the input channel into the output channel and wherein the blocker is positioned to interrupt light transfer between the channels and the mirror element.

In one embodiment, each channel is formed of two sections, a lower section associated with the container and an upper section associated with the lid, the upper and lower sections having separated portions where the lid fits onto the container, the separated portions aligning when the lid is correctly fitted to the container to form the optic circuit.

In one embodiment, the lower section of each channel is internal of a handle of the container.

In one embodiment, the channels terminate in respective input and output portions that optically couple to the respective light transmitter and light sensor provided in the base of the food processor.

In one embodiment, the light blocker transitions through an intermediate position between open and closed positions and a spring is provided to urge the light blocker into both the open and closed positions after transitioning through the intermediate position.

BRIEF DESCRIPTION OF THE DRAWINGS

Preferred embodiments of the present invention will be described by way of example only, with reference to the accompanying drawings, in which.

DETAILED DESCRIPTION

Figure 1:
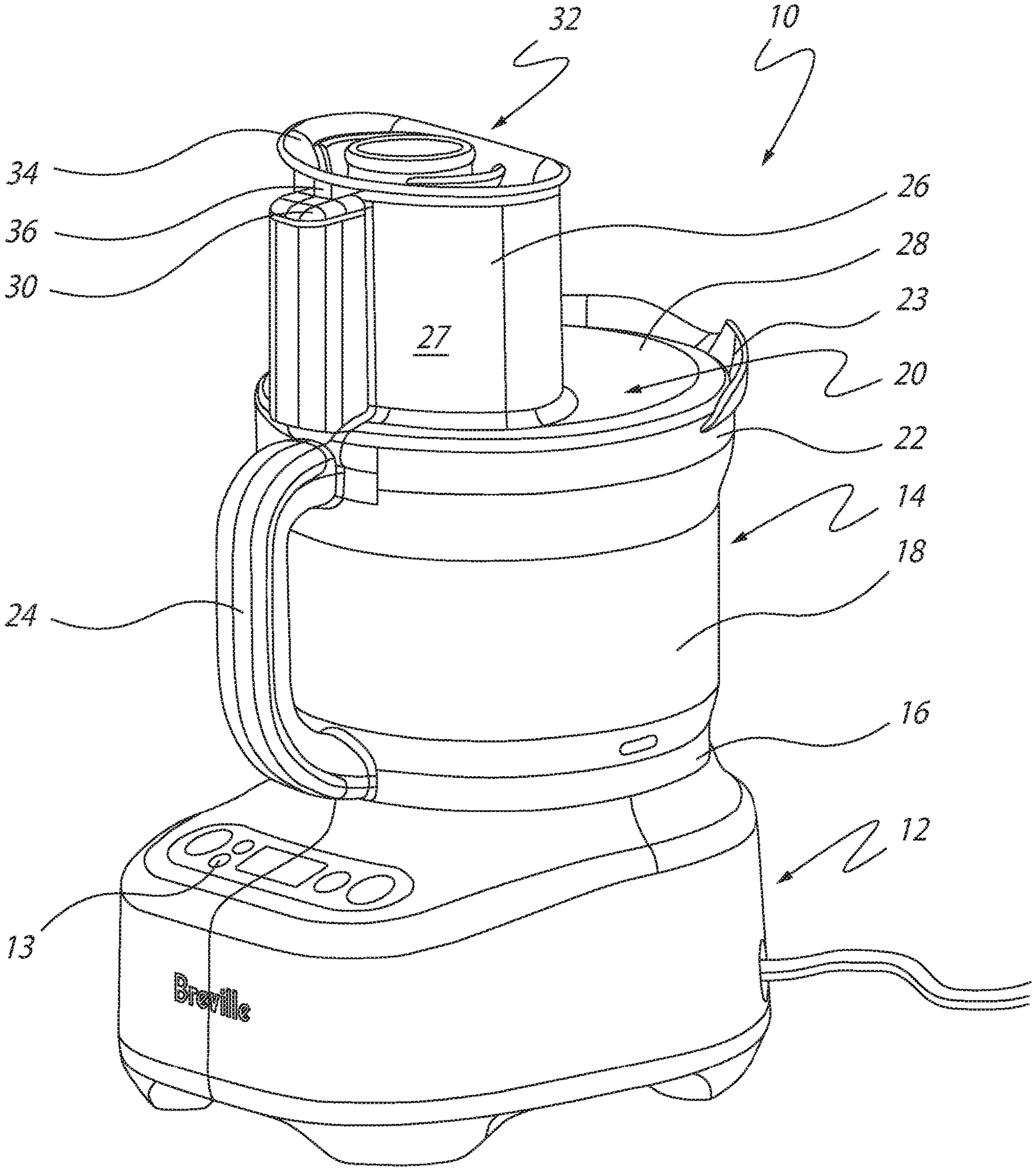
FIG. 1 is a schematic isometric view of a food processing device.

In FIG. 1 of the accompanying drawings, there is schematically depicted a food processing device 10 including a base 12 having a user interface 13 to facilitate user control and operation of the base 12. The base 12 houses a drive motor (not shown) that is operable using electric power to cause processing of food, for example, by driving rotation of a food processing accessory that is coupled to a drive shaft. The drive motor is operatively associated with a microprocessor (not shown) or a special electronic circuit (without the microprocessor) located within the base 12, and which detects various signals from the user interface 13 or one or more sensors to enable or disable operation of the drive motor.

The food processing device 10 further includes a vessel or container 14 that is removably mounted on the base 12. The vessel 14 includes a bottom wall 16, and a side wall 18 extending upwardly from the bottom wall 16 to a cover member 20. In the depicted embodiment, the cover member 20 includes a lid that is removably coupled to a rim 22 defined by the side wall 18 of the vessel 14, with the rim 22 surrounding a top opening (not shown) of the vessel 14. The cover member 20 may include one or more guiding portions 23 to assist with the pouring of processed food from the vessel 14. It will be appreciated that in other embodiments (not shown), the cover member 20 may be integrally formed with the side wall 18 of the vessel 14. In the depicted embodiment, the vessel 14 also includes a handle 24 extending from the side wall 18 for ease of handling, although it will be appreciated that in some embodiments, the vessel 14 may not necessarily need to be provided with a handle 24.

The cover member 20 includes a feed tube/feed chute 26, which, in the depicted embodiment, is shown to extend upwardly from an upper surface 28 of the cover member (lid) 20. The feed tube 26 in the depicted embodiment includes a longitudinal slot 30. The food processing device 10 further includes a pusher member or plunger 32 that is slidably received in the feed tube 26. The pusher member 32 is provided to guide food through the feed tube 26 into the vessel 14. In the depicted embodiment, the pusher member 32 includes a body 34 having a rail portion 36. The rail portion 36 may be formed as a protrusion that extends along the body 34 in a longitudinal direction. In other embodiments (not shown), the rail portion 36 may be formed as a simple protrusion that is disposed at an upper portion of the body 34, or at any other suitable location of the body 34, to facilitate insertion into the longitudinal slot 30, as will be discussed in further detail below.

Figure 2:
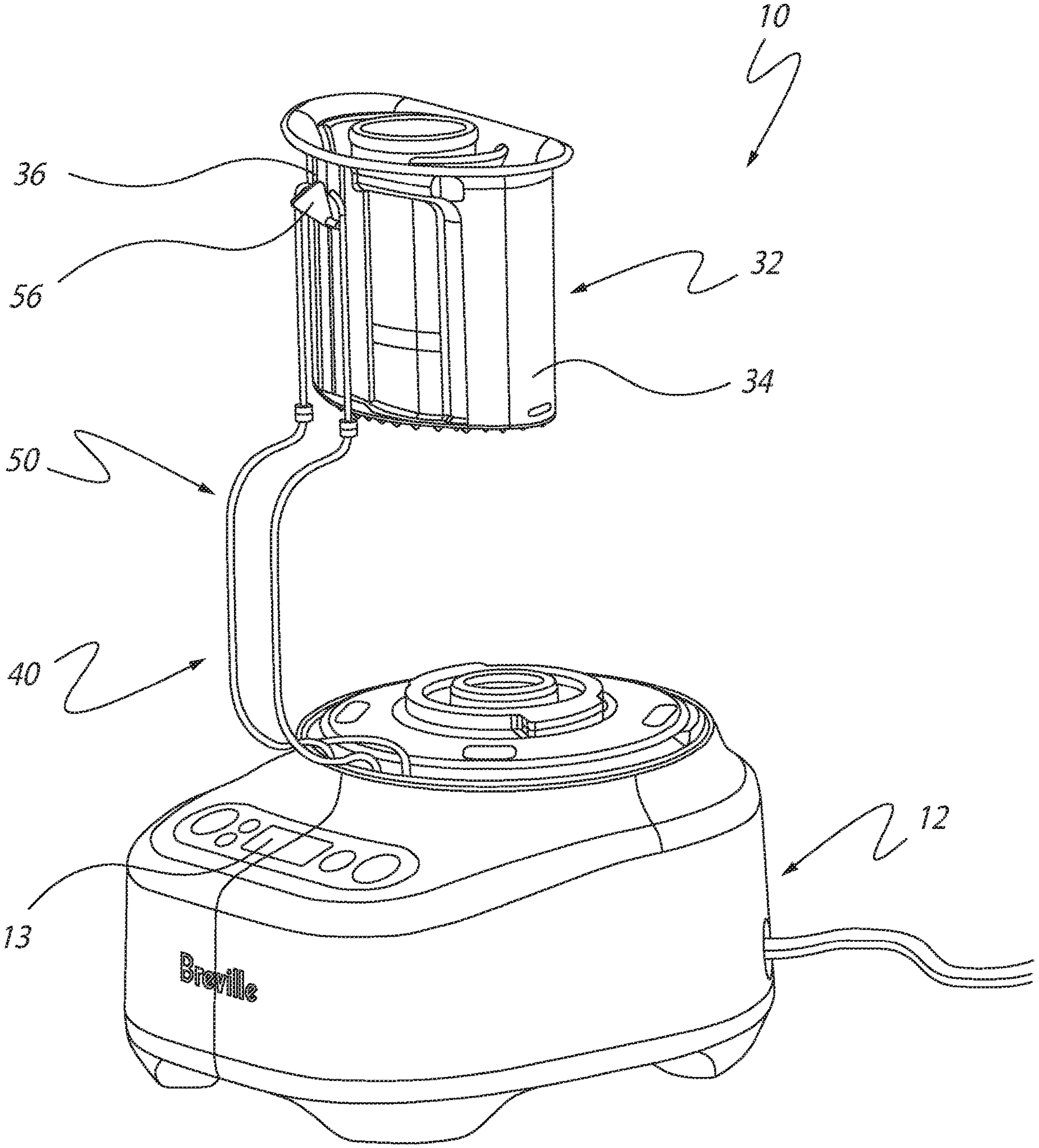
FIG. 2 is a schematic isometric view of the food processing device shown in FIG. 1, with the vessel removed for clarity.
Figure 3:
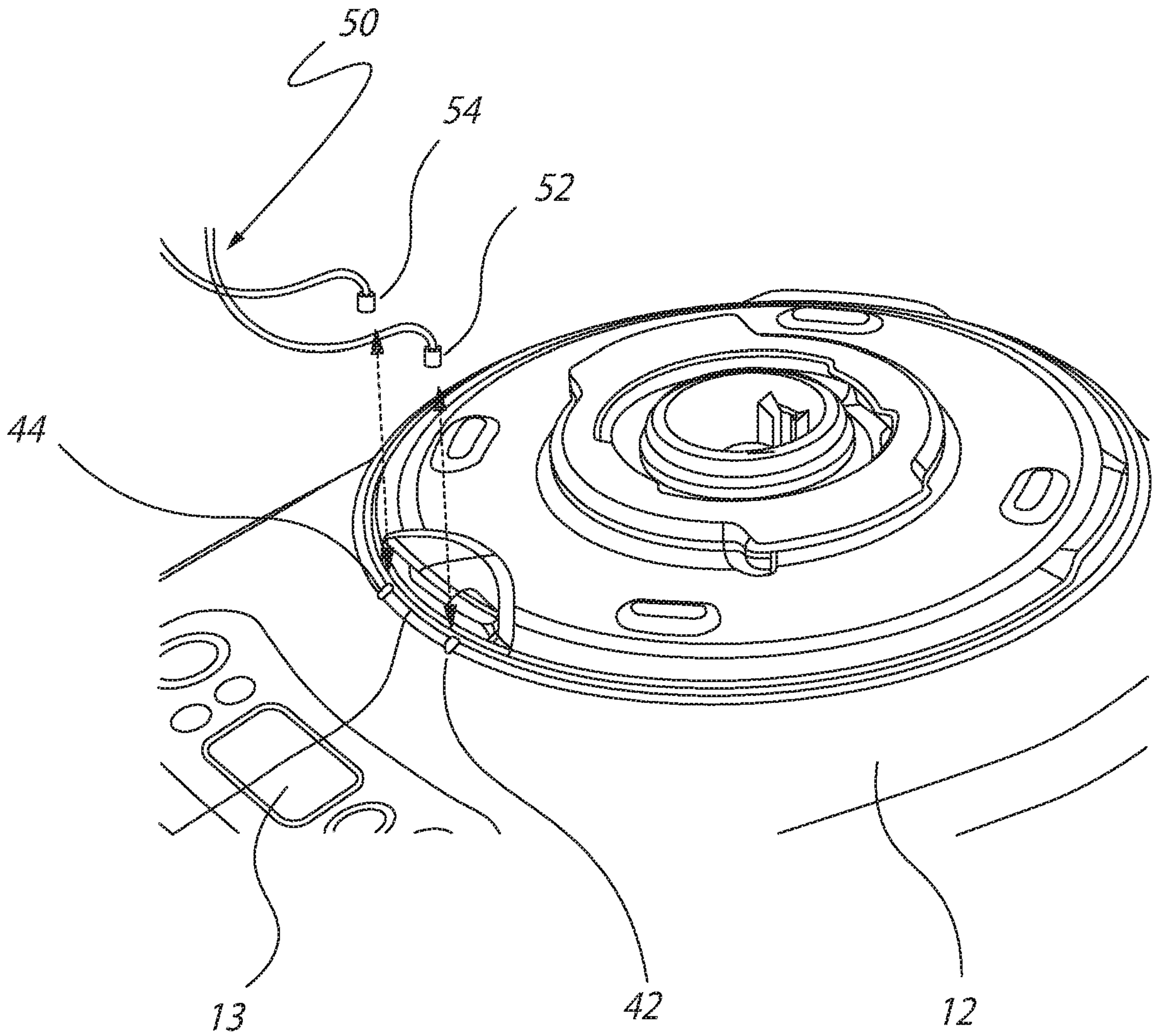
FIG. 3 is an enlarged partial isometric view of a base of the food processing device shown in FIG. 1.

As best shown in FIG. 2, the food processing device 10 further includes an interlock system 40 that is operatively associated with the drive motor of the base 12. The interlock system 40 facilitates the operation of the drive motor so as to cause processing of food in the vessel 14. Referring to FIG. 3, the interlock system 40 includes a light transmitter 42 and a light sensor 44 each located on the base 12. In other embodiments (not shown), the light transmitter 42 and the light sensor 44 may be housed within the base 12, or alternatively located in or on the vessel 14. The light transmitter 42 is operable to provide a beam or path of light that is receivable or detectable by the light sensor 44. It will be understood that upon mounting of the vessel 14 on the base 12, the light transmitter 42 and the light sensor 44 would both be located adjacent the bottom wall 16 of the vessel 14. The light transmitter 42 may be an infrared (IR) or LED light source, for example, and may be powered by induction (for example, by way of an induction element located in the base 12, as will be described in further detail below). The light sensor 44 may be an optical sensor such as a photoresistor, for example.

The interlock system 40 further includes a light channel 50 having an input end portion 52 associated with the light transmitter 42 and an output end portion 54 associated with the light sensor 44. The light channel 40 therefore allows the path of light to travel therethrough from the input end portion 52 (which receives light from the light transmitter 42) to the output end portion 54 (which directs light from the light transmitter 42 to the light sensor 44).

Figure 4:
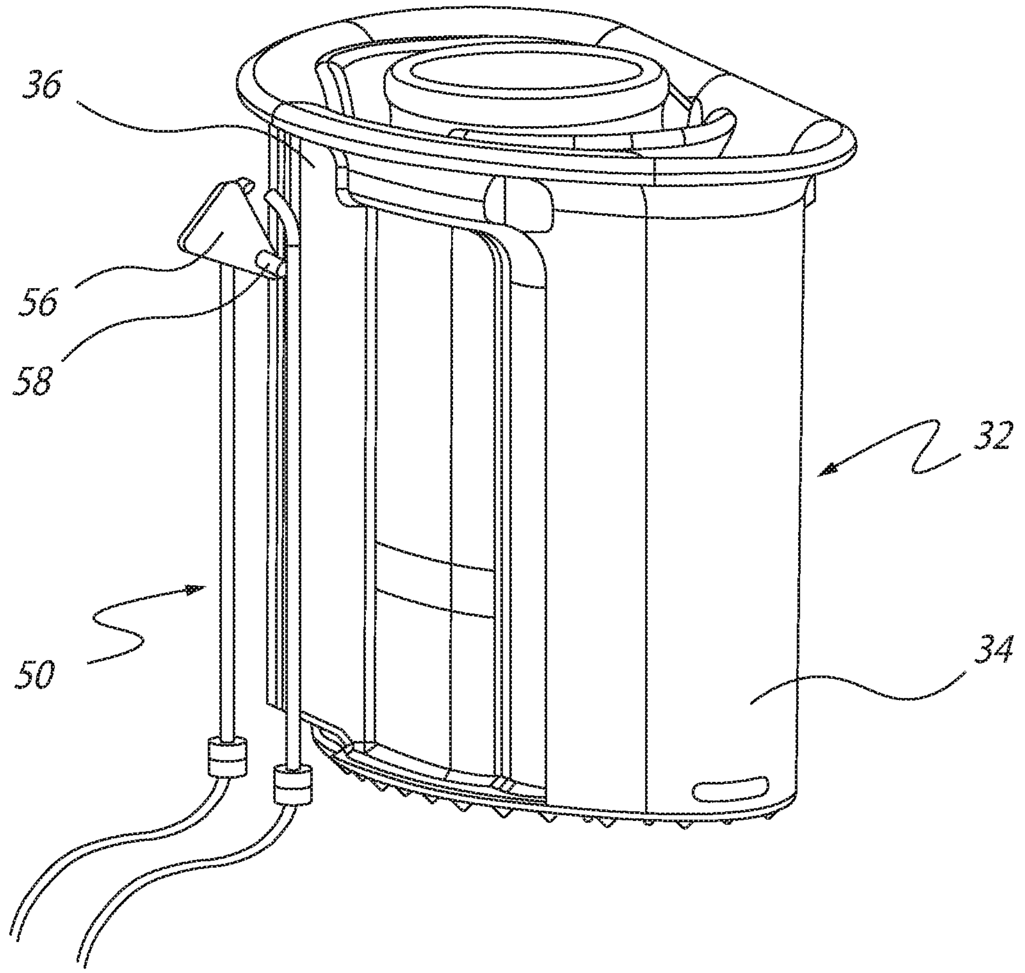
FIG. 4 is an enlarged partial isometric view of a pusher member, a light blocker, and a light channel of the food processing device shown in FIG. 1, with the light blocker shown in an open position.
Figure 5:
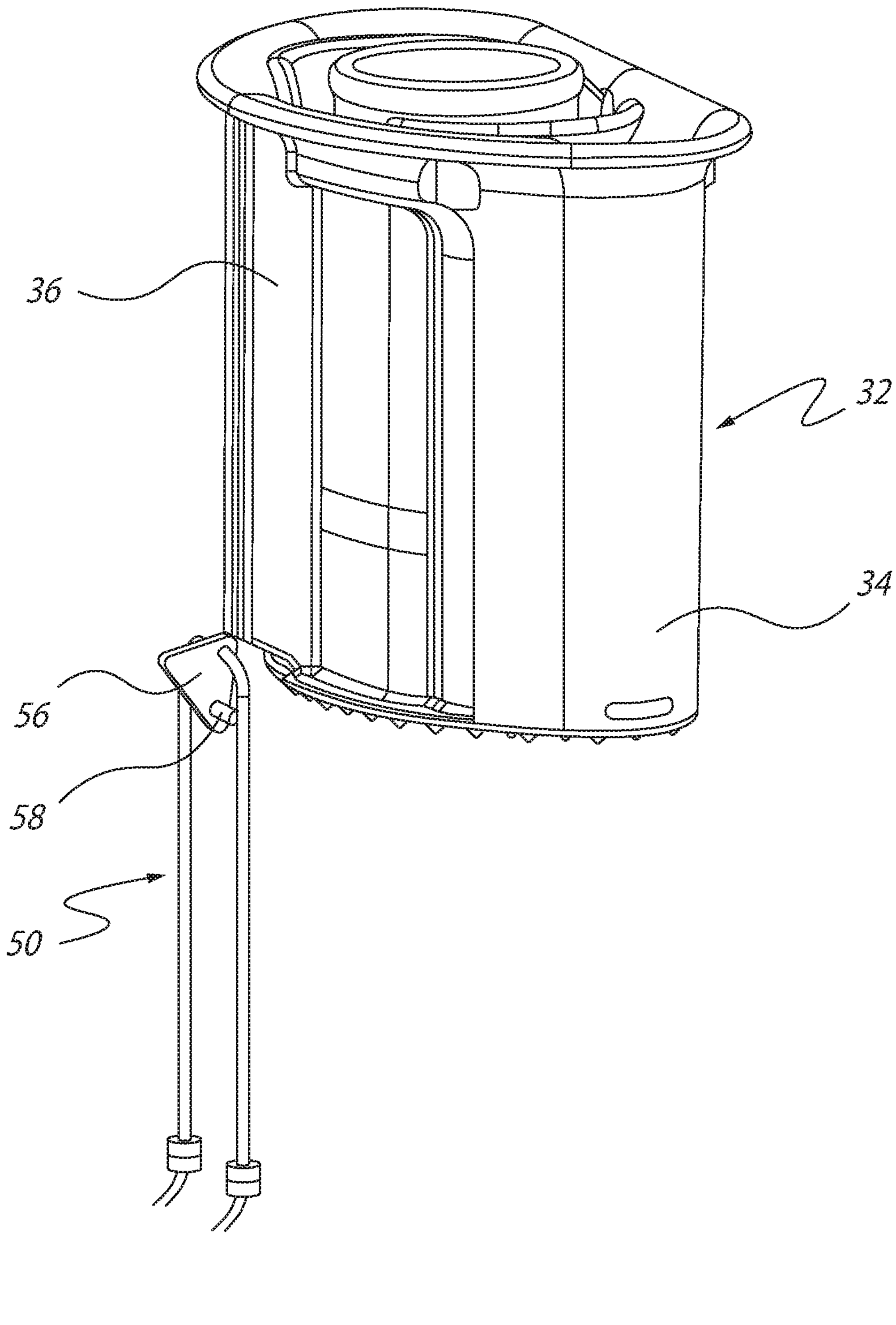
FIG. 5 is an enlarged partial isometric view of a pusher member, a light blocker, and a light channel of the food processing device shown in FIG. 1, with the light blocker shown in a closed position.

Referring to FIG. 4, the interlock system 40 further includes a light shield or blocker 56 located between the input and output end portions 52, 54 of the light channel 50. The light blocker 56 may be mountable within the longitudinal slot 30 of the feed tube 26 by way of a pin 58, whereby the light blocker 56 may be pivotable about the pin 58 into various positions relative to the slot 30. In the depicted embodiment, the light blocker 56 is movable between a closed position (see FIG. 5) to block the path of light travelling through the light channel 50, and an open position (see FIG. 6) to permit the path of light through the light channel 50. In the closed position, the drive motor of the food processing device 10 is not permitted to operate, thereby providing a safety feature against accidental or intentional operation of the food processing device 10. In the open position, in which the path of light is able to travel through the light channel 50, the light sensor 44 is thus allowed to detect the path of light from the light transmitter 42. Upon detection of light by the light sensor 44, a corresponding signal is sent to the microprocessor (or a special electronic circuit is actuated upon), which then enables operation of the drive motor.

Figure 8:
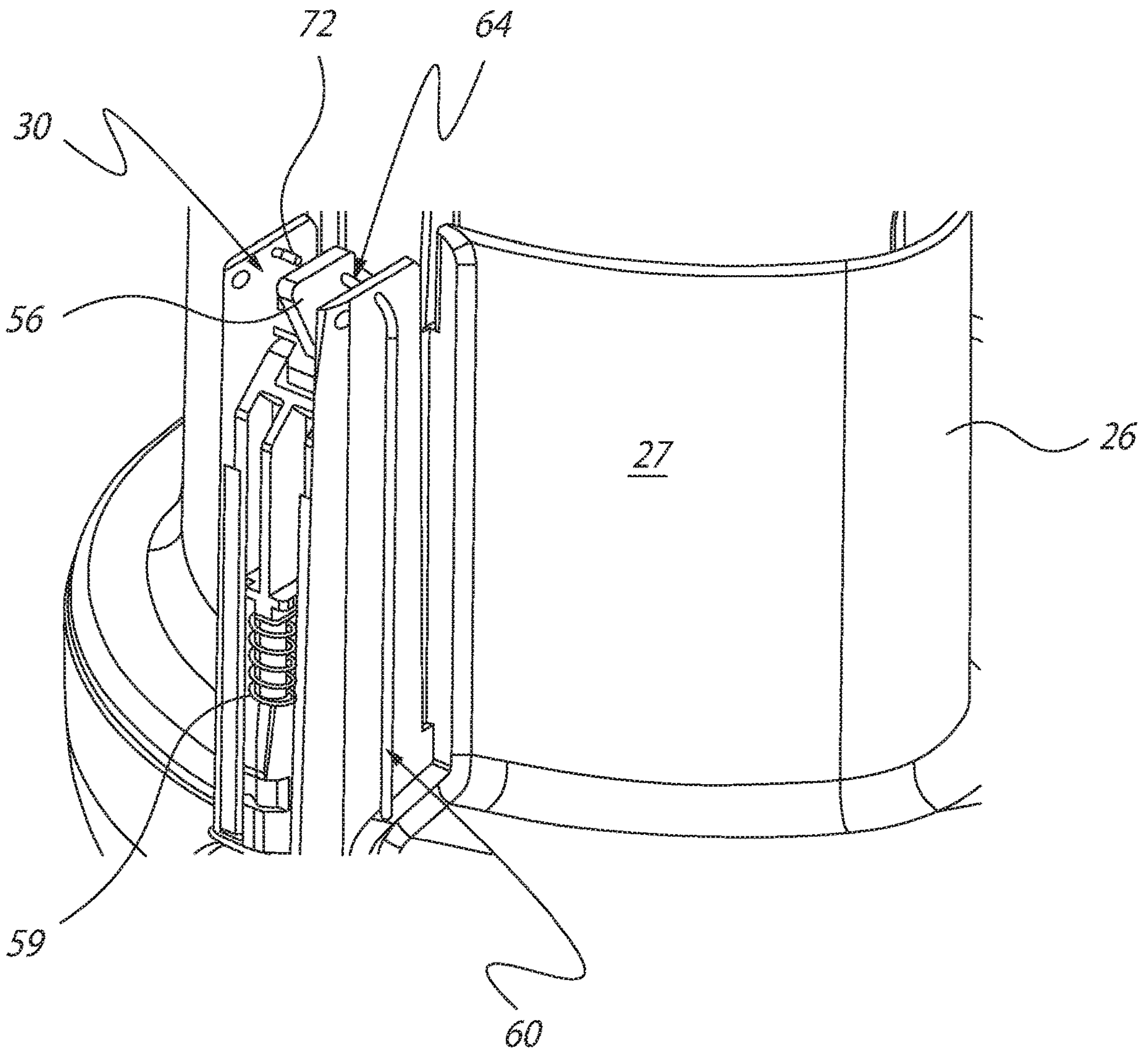
FIG. 8 is an enlarged partial isometric view of a feed tube of the food processing device shown in FIG. 1.

It will be appreciated that the light blocker 56 is movable to the open position by engagement of the rail portion 26 of the pusher member 32 with the longitudinal slot 30 of the feed tube 26. Alternatively, as discussed below, the light blocker 56 may be movable to the open position by engaging any other portion of the pusher member 32 (i.e. the pusher member 32 slides into the feed tube 26, then contacts and moves the light blocker 56 out of the path of light). The light blocker 56 may be biased towards the closed position such that the path of light between the light transmitter 42 and the light sensor 44 is blocked in a resting state of the interlock system 40. The light blocker 56 may be biased towards the closed position by way of a resilient member such as a spiral spring 59 (for example, as shown in FIG. 8). It will be understood that other forms of resilient members (not shown) may be used to bias the light blocker 56 towards the closed position. Upon insertion of the pusher member 32 into the feed tube 26, the rail portion 26 (or any other protrusion or feature of the pusher member 32, or the main body of the pusher member 32 itself) urges or pushes the light blocker 56 from its closed position to the open position, whereby the light blocker 56 pivots or swings away from the path of light.

Figure 6:
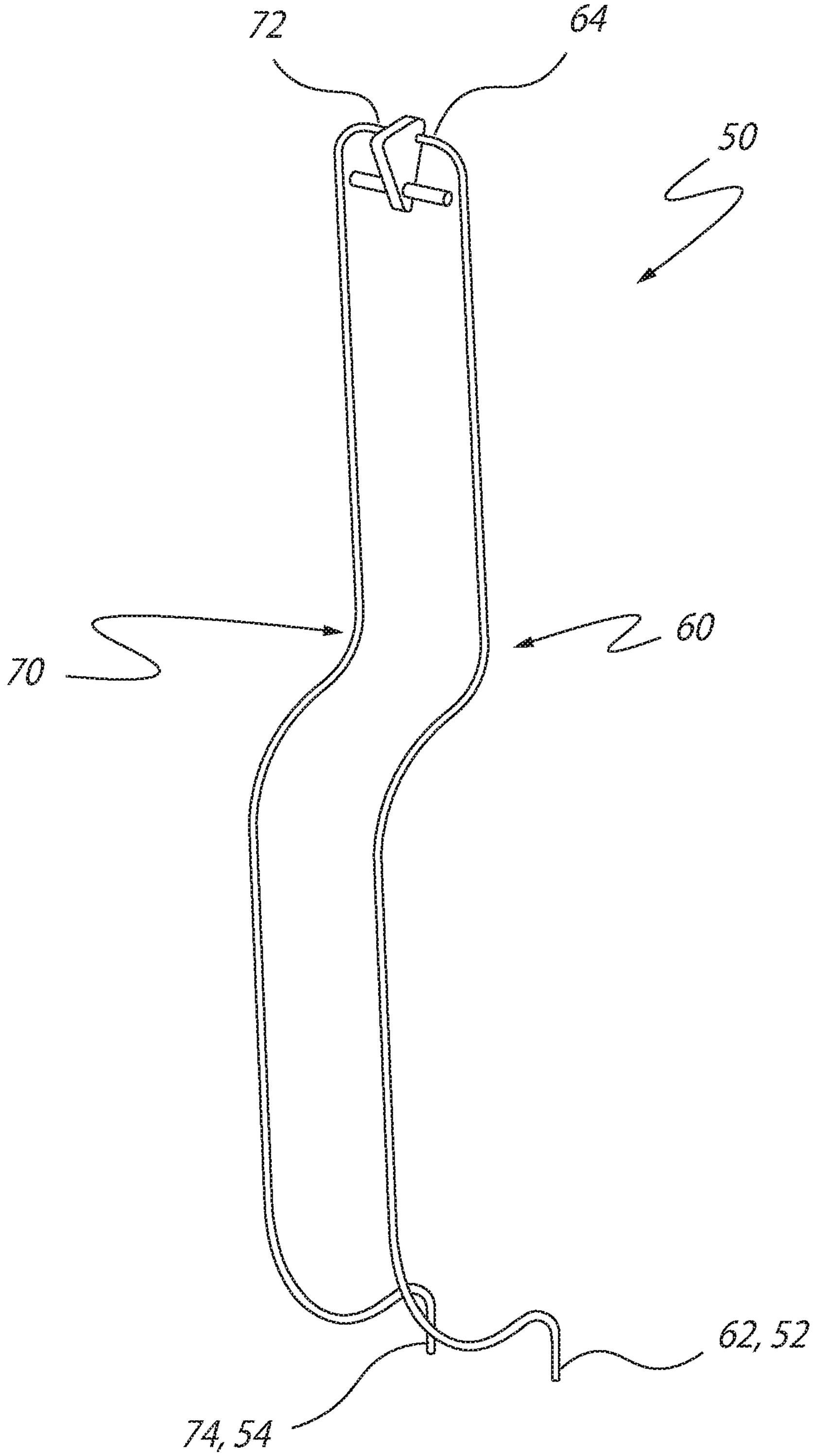
FIG. 6 a schematic isometric view of an embodiment of the light channel of the food processing device shown in FIG. 1.

In the embodiment depicted in FIG. 6, the light channel 50 is shown to comprise an input channel 60 having a first end portion 62 and a second end portion 64 that is spaced from the first end portion 62. Accordingly, it will be understood that the first end portion 62 of the input channel 60 provides the input end portion 52 of the light channel 50. The light channel 50 further comprises an output channel 70 having a first end portion 72 and a second end portion 74 that is spaced from the first end portion 72. The first end portion 72 of the output channel 70 is disposed adjacent the second end portion 64 of the input channel 60, and the second end portion 64 provides the output end portion 54 of the light channel 50.

The light blocker 56 is located between the second end portion 64 of the input channel 60 and the first end portion 72 of the output channel 70, such that in the closed position (i.e. the resting state of the interlock system 40), the light blocker 56 blocks any light travelling from the light transmitter 42 along the light path through the light channel 50. In the open position, the light blocker 56 is moved away from the path of light, thereby allowing the communication of light from the light transmitter 42 to the light sensor 44.

The light channel 50 may extend anywhere along the side wall 18 of the vessel 14. Alternatively, and in the embodiment as depicted in FIG. 1, for example, the light channel 50 extends along the handle 24 of the vessel 14. It will be appreciated that the light channel 50 may be located at any position relative to the vessel 14 to allow the input end portion 52 and the output end portion 54 to be locatable with respect to the light transmitter 42 and the light sensor 44, respectively. As discussed above, the light transmitter 42 and the light sensor 44 may each be located on the base 12 and in the depicted embodiment, the light transmitter 42 and the light sensor 44 are each located adjacent the user interface 13 and directly below the location of the feed tube 26. It will, however, be understood that the light transmitter 42 and the light sensor 44 may alternatively be located at any other location in, on or around the base 12, or alternatively located in or on the vessel 14.

The location of the light channel 50 also depends on the configuration of the vessel 14 and the feed tube 26. As shown in the embodiment of FIG. 1, for example, the light channel 50 extends along the handle 24 of the vessel 14 and also along a sidewall 27 of the feed tube 26. Accordingly, the light channel 50 may extend along more than one component of the food processing device 10.

Figure 7:
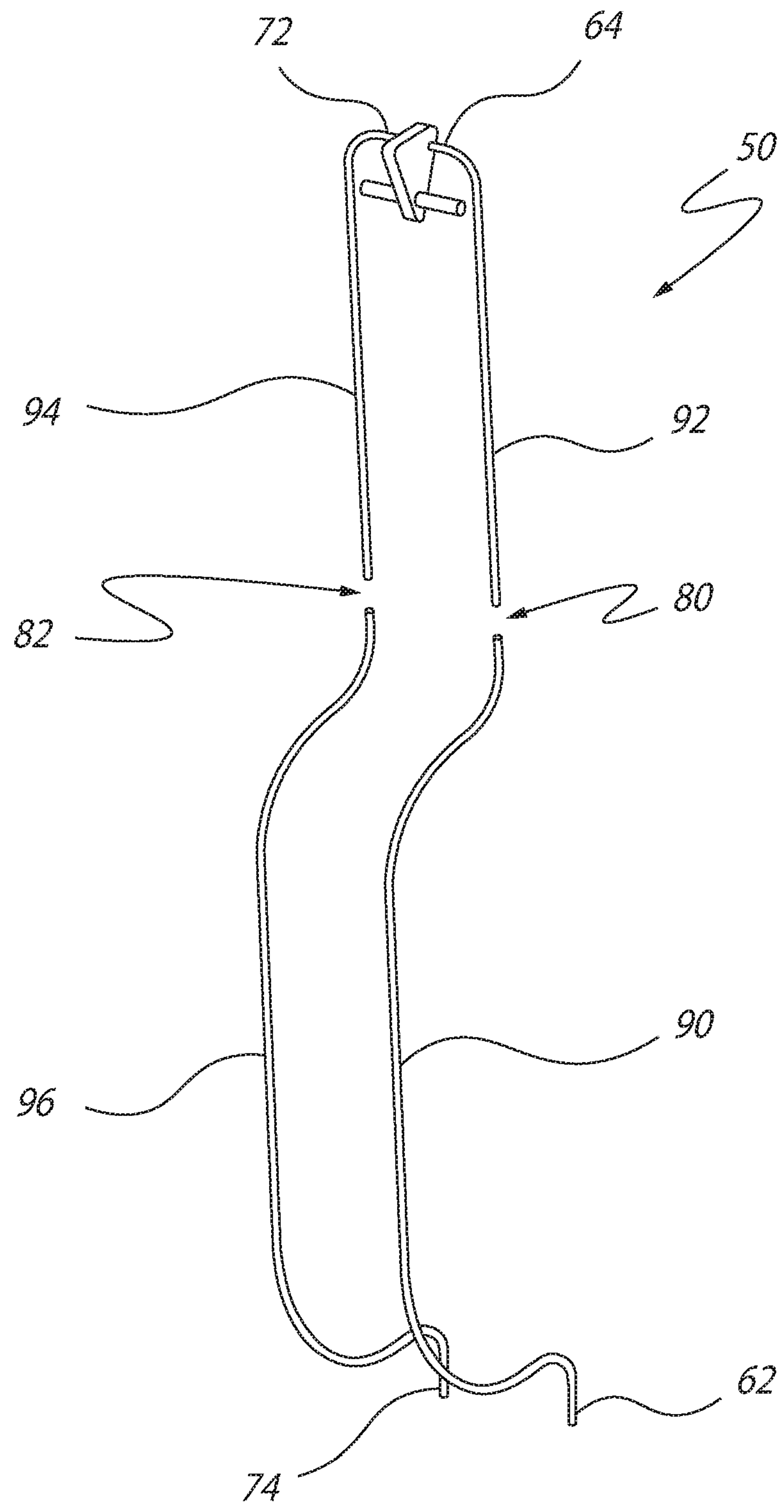
FIG. 7 a schematic isometric view of another embodiment of the light channel of the food processing device shown in FIG. 1.

In an embodiment whereby the cover member 20 is a lid that is removably coupled to the rim 22 of the vessel 14, it will be understood that the light channel 50 may effectively have separated portions or gaps corresponding to the location where the lid and the vessel 14 are separated. For example, as shown in FIG. 7, the input channel 60 of the light channel 50 may have a separated portion 80 located between the first end portion 62 and the second end portion 64. Similarly, the output channel 70 includes a separated portion 82 between the first end portion 72 and the second end portion 74. The separated portions 80, 82 coincide with the location at which the vessel 14 is separable from the lid. It will be appreciated that the separated portions 80, 82 still allow for the light path to travel along the light channel 50, as the light can "jump" across the separated portions 80, 82. In this embodiment, the input channel 60 is effectively separated into two channels by the separated portion 80: a first input channel 90 and a second input channel 92. Similarly, the output channel 70 is separated into two channels by the separated portion 82: a first output channel 94 and a second output channel 96. In this embodiment, the linking of the first input channel 90 with the second input channel 92, and similarly the linking of the first output channel 94 to the second output channel 96, may also provide a corresponding signal to the microprocessor that the lid is correctly located on the rim 22 and that it is safe to operate the food processing device 10. The various channels may be formed as elongated tubular members or pipes, or may otherwise be in the form of wires or cables, or any other channel or conduit that allows for the travel of light. In other embodiments (not shown), the light channel 50 may have additional separated portions or gaps corresponding to the location where the vessel 14 and the base 12 are separated.

Figure 9B:
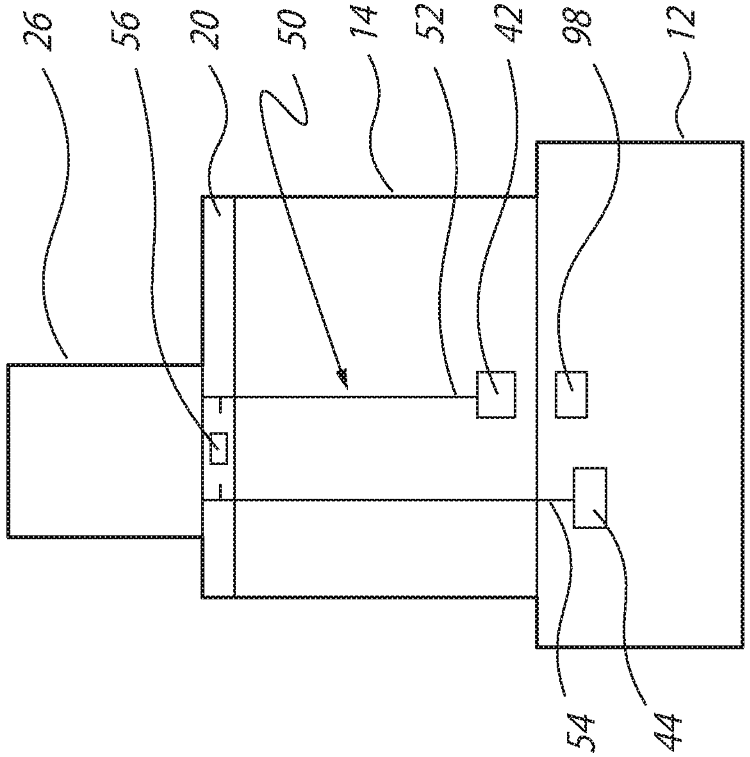
FIGS. 9A and 9B are schematic front views showing various arrangements of the light channel of the food processing device shown in FIG. 1.
Figure 9A:
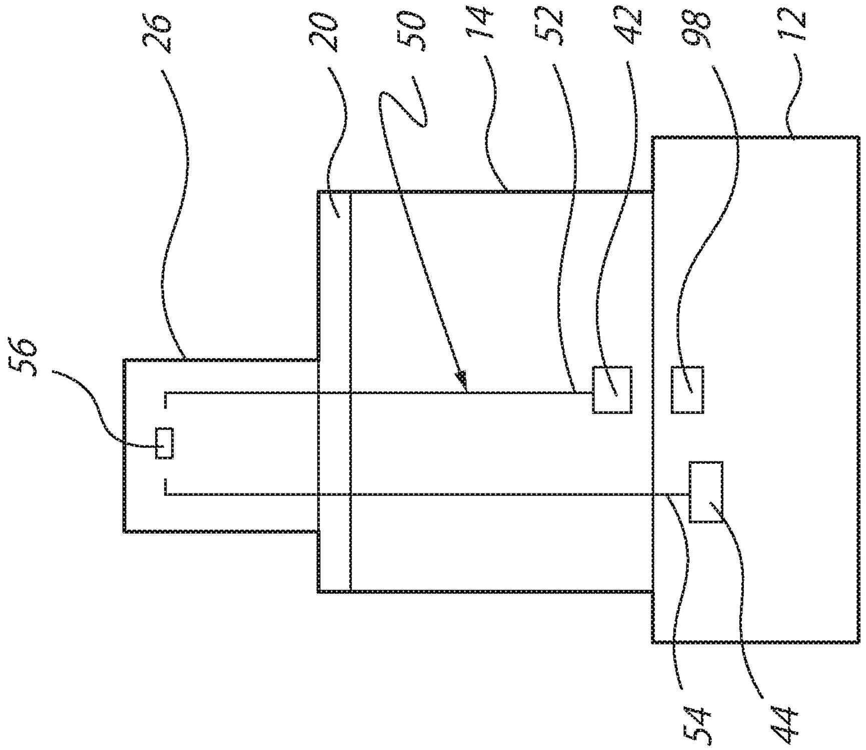

FIGS. 9A and 9B depict various alternative arrangements of the light channel 50, the light transmitter 42, the light sensor 44 and the light blocker 56 in relation to the base 12, the vessel 14, and the feed tube 26. In the embodiment as shown in FIG. 9A, the light transmitter 42 is located at the vessel 14 and is powered by induction (for example, by way of induction element 98 located in the base 12). The light sensor 44 is located in the base 12. Accordingly, in this arrangement, the input end portion 52 of the light channel 50 is located at the vessel 14, and the output end portion 54 of the light channel 50 is located at the base 12. The light blocker 56 is located at the feed tube 26 and disposed between the input and output end portions 52 and 54. A similar arrangement is shown in FIG. 9B, with like reference numerals being used to depict like features. However, in this embodiment, the light blocker 56 is located adjacent the cover member (lid) 20. It will be appreciated that in this embodiment, the light blocker 56 is actuatable by engagement of the lid 20 with the rim 22 of the vessel 14.

Figure 10:
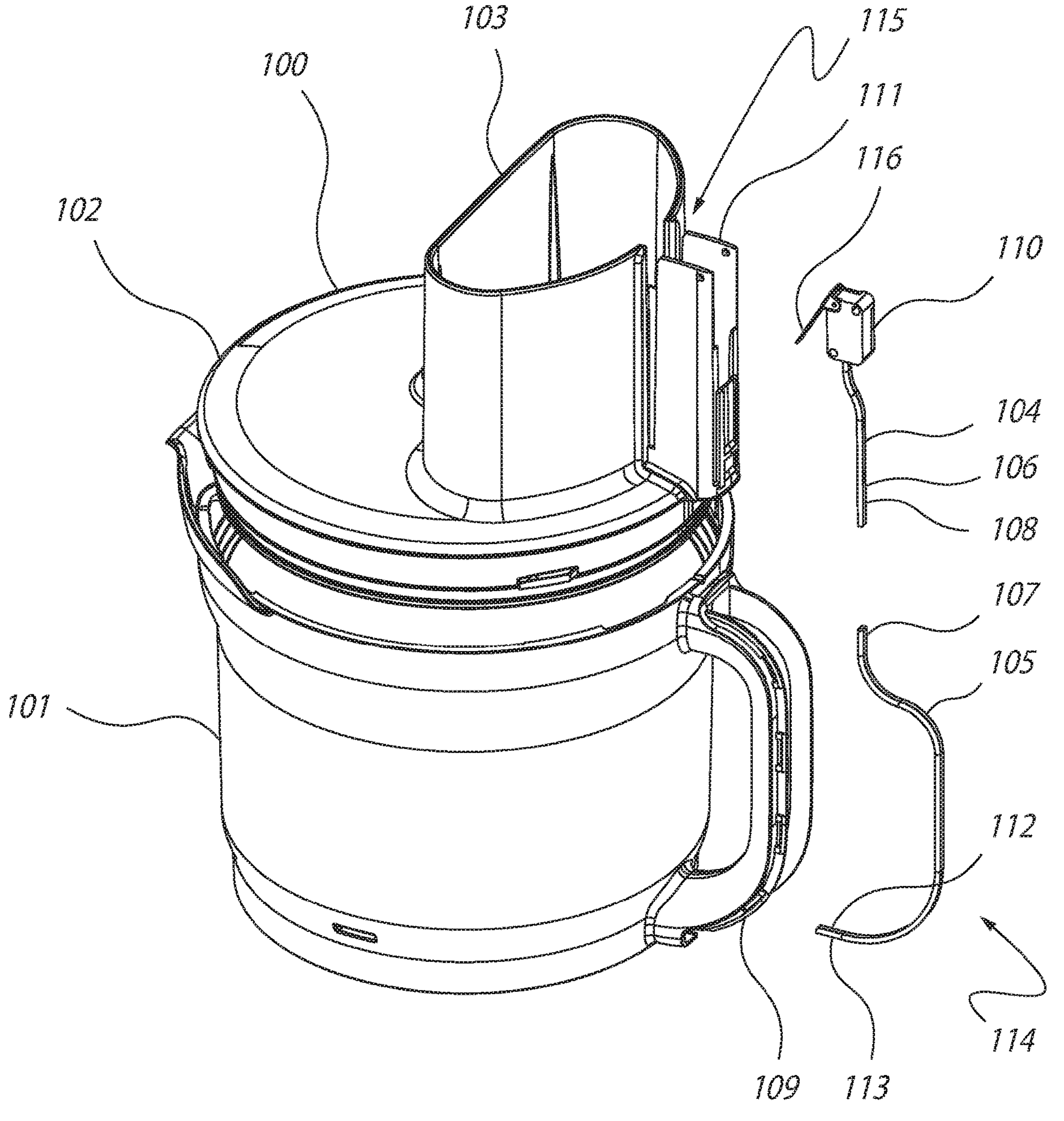
FIG. 10 is a diagrammatic perspective view of another food processing device.

FIG. 10 shows another food processing device 100 which includes a container 101 and a lid 102 with a feed chute 103. The container 101 is adapted to fit onto a base 12 (described above with reference to FIGS. 1 to 9). A conduit 104 is formed of a lower section 105 and an upper section 106, separated by adjoining end portions 107, 108. The lower section 105 is housed within a handle 109 of the container 101 and the upper section 106 is coupled to a light switch 110 which is arranged internally of a side housing 111 adjacent the feed chute 103.

When the lid 102 is correctly fitted to container 101, the light switch 110 becomes operational as a result of the end portions 107, 108 being in alignment to create an optic circuit from an input end portion 112 of the conduit 104, through the light switch 110 and back to an output end portion 113 of the conduit 104, to form part of an interlock system 114. The input end portion 112 and output end portion 113 are adapted to connect to the light transmitter 42 and light sensor 44 in the base 12, described above with reference to FIG. 3.

The side housing 111 includes a slot 115 which communicates with the feed chute 103. The slot 115 receives a rail/protrusion of a plunger/push member 32 (as described above with reference to FIGS. 1 to 5) when the plunger 32 is used to push foodstuff through the chute 103. The switch 110 includes an actuator 116 which is shown in a first position. The switch 110 and actuator 116 are mounted inside the housing 111 so that the plunger engages and moves the actuator 116 to a second position, when the plunger is inserted in the feed chute 103.

Figure 11:
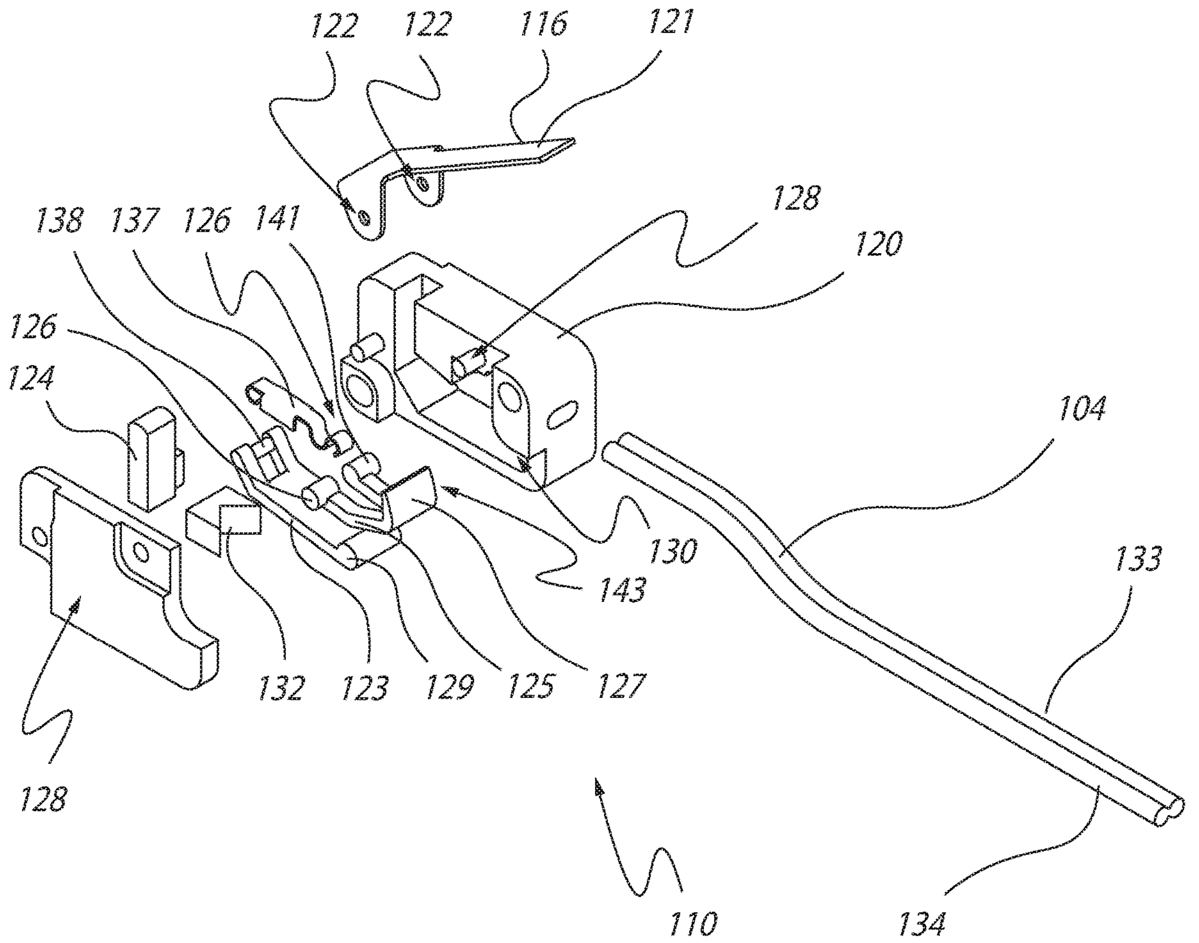
FIG. 11 is an exploded isometric view of a light switch.

FIG. 11$_{[AG1]}$ shows the light switch 110 in more detail. The switch 110 includes a main body 120 with the actuator 116 being in the form of a lever 121 coupled to the body 120 via pivots 122. The lever 121 acts on a platform 123 via a pushrod 124. The platform 123 supports a light blocker 125 which hinges around pins 126 to rotate a blocking blade 127 in and out of a light beam from the conduit 104. The pins 126 are mounted in holes 128 in the body 120. The platform 123 pivots about a hinge point 129 which is received in recess 130 in the body 120 and is connected to the pushrod 124 via a coupler 130.

A spring 137 is clipped onto a cross bar 138 of the platform 123 at one end and has a hook 141 at the other end to connect to a bridge 143 of the blocker 125, to urge the blocker 123 into either a blocking or non-blocking position, as described below.

The conduit 104 is secured in a port 131 formed in the body 120 and a mirror element 132 is positioned to reflect light from an input channel 133 of the conduit 104, back to an output channel 134.

Figure 12A:
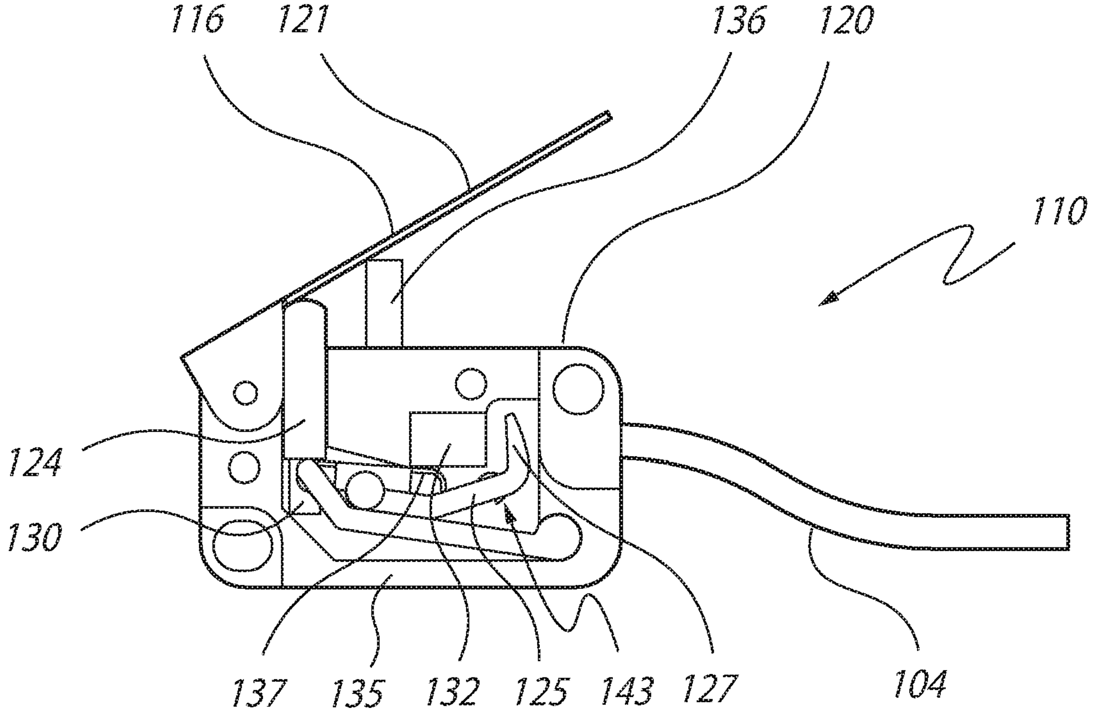
FIG. 12*a* is sectioned side view of the light switch in a closed condition.
Figure 12B:
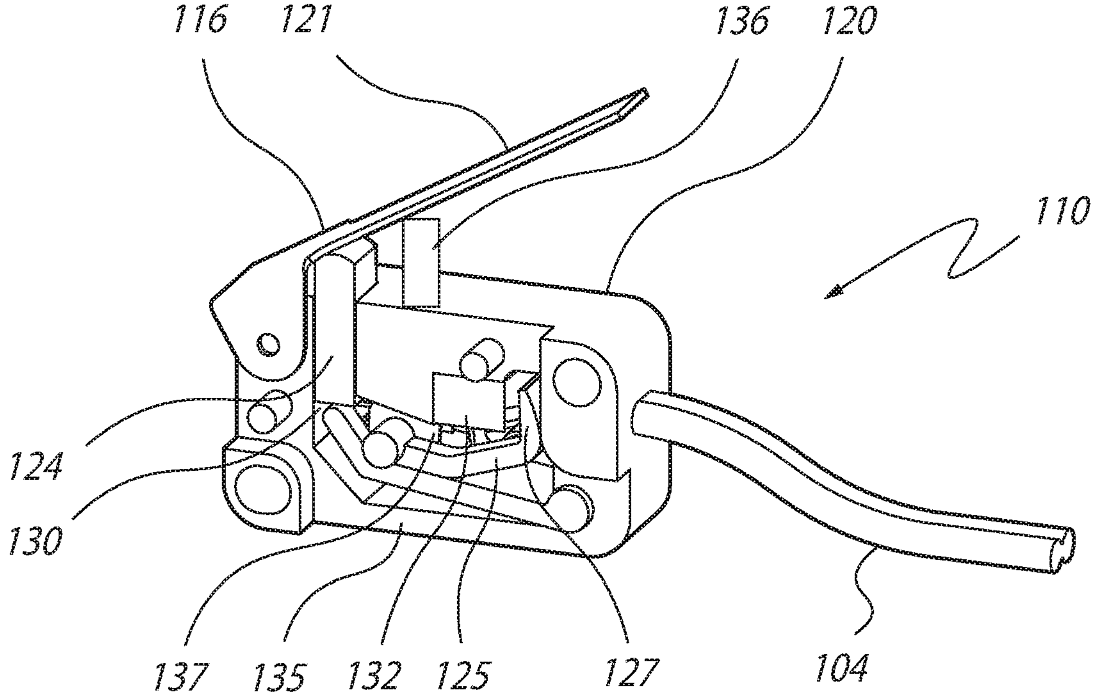
FIG. 12*b* is a sectioned isometric view of the light switch in a closed condition.

FIGS. 12*a* and 12*b* show the light switch 110 with the actuator 116 in the first position, where the lever 121 is angled away from the body 120 and the pushrod 124 is in a lifted position. The actuator 116 and/or pushrod 124 are preferably biased toward that position by a biasing element 136. The biasing element 136 may be a spring or the like.

As can be seen, when the actuator 116 is in the first position, the pushrod 124 and coupler 130 are distanced from a base 135 of the switch body 120, so that the platform 123 holds the blocker 125 in a position where the blade 127 blocks light transmission between the mirror element 132 and the conduit 104.

This arrangement interrupts light transmission through the switch 110. The spring 137 assists in urging the blocker 125 into the blocking position.

Figure 13A:
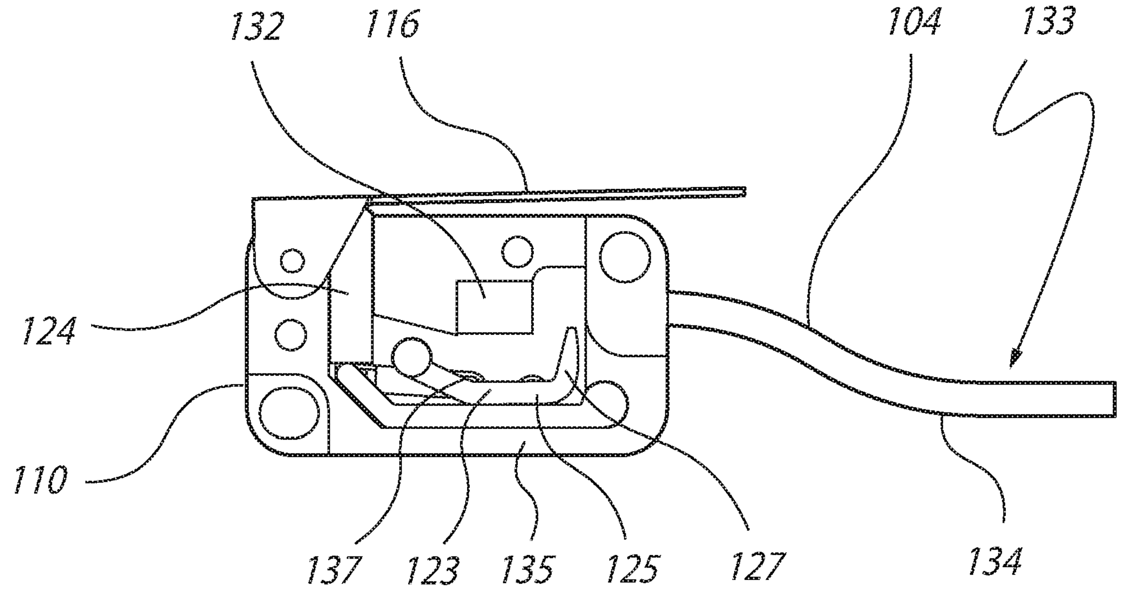
FIG. 13*a* is a sectioned side view of the light switch in an open condition.
Figure 13B:
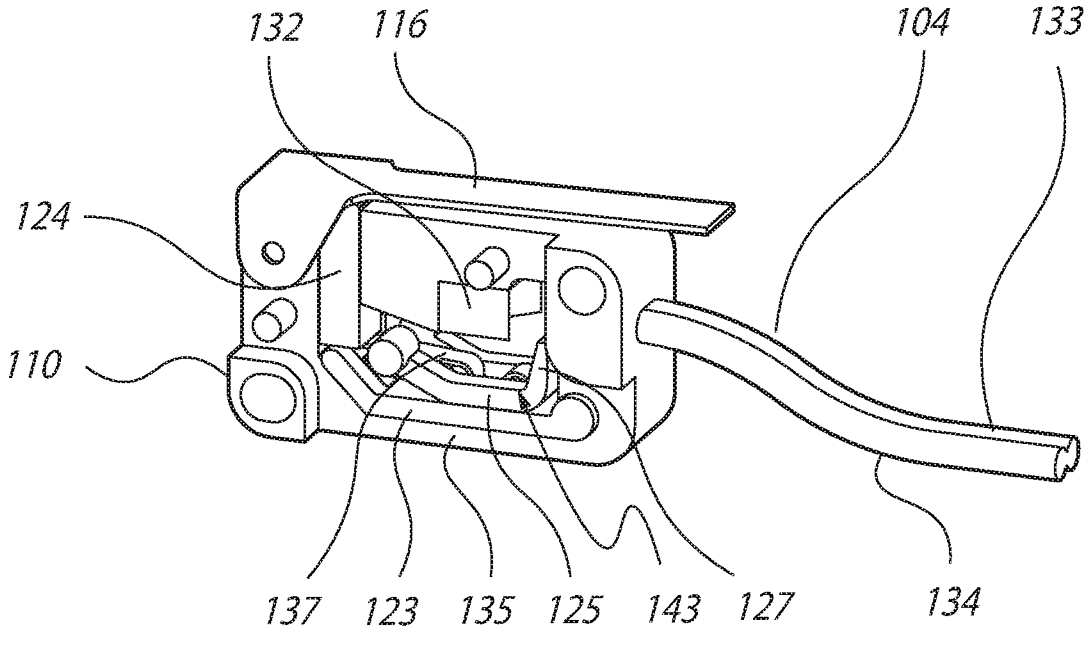
FIG. 13*b* is a sectioned isometric view of the light switch in the open condition.

FIGS. 13*a* and 13*b* illustrate the actuator 116 in a second position. This position is adopted when a plunger 32 (again, as described above, with reference to FIGS. 1 to 5) is received in the feed chute 103—shown in FIG. 10. The actuator 116 causes the pushrod 124 to move the platform 123 toward the base 135 of the switch 110, resulting in corresponding pivotal movement of the blocker 125 to remove the blade 127 from blocking light transmission between the conduit 104 and the mirror element 132. As such, light from the input channel 133 is able to reflect off the mirror element 132 into the output channel 134 and back down the conduit 104, to allow operation of the food processing device in a manner described above with reference to FIGS. 1 to 9.

The spring 137 assists in urging the blocker 125 into both the blocking and non-blocking positions.

Figure 14:
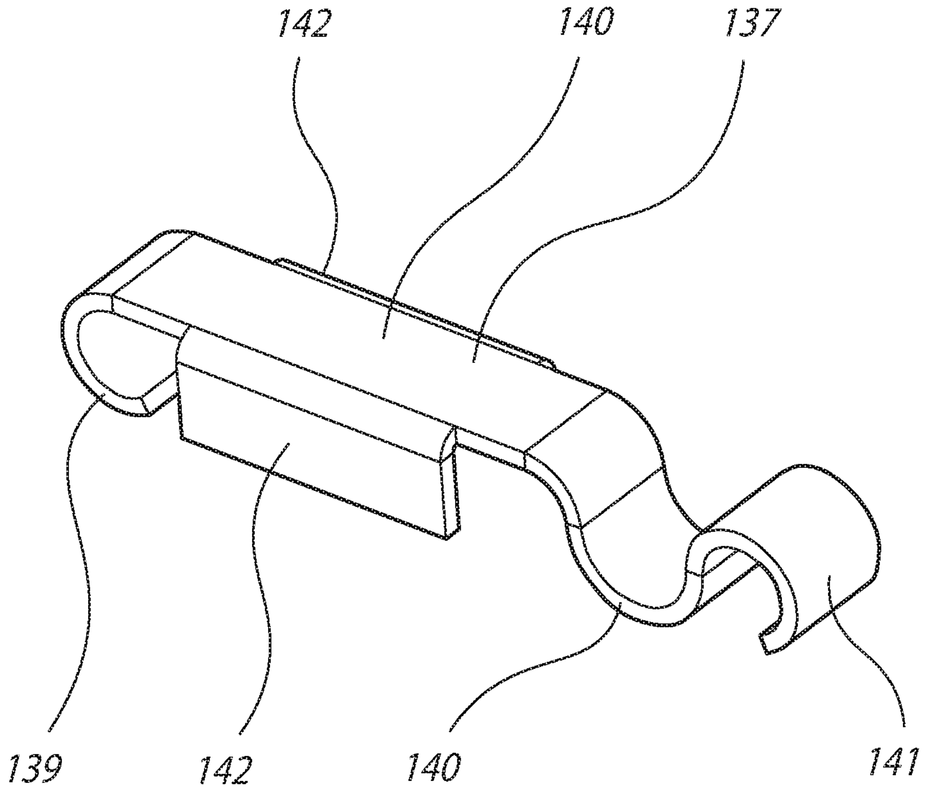
FIG. 14 is a perspective view of a spring.

FIG. 14 shows the spring 137 in more detail as including a clip 139 at one end of a main body 140, with side tabs 142 and the hook 141 at an opposite end of the body 140. The hook 141 is attached to the main body 140 via a resilient section 140 which is designed to expand and retract as the spring 141 extends and contracts. The spring 137 extends and retracts as a result of the platform 123 and light blocker 25 of FIGS. 12 and 13 rotating relative to each other to move blocker 125 between the blocking and non-blocking positions, respectively. In this specific example, the spring 141 is biased toward a contracted condition. This means the spring 137 is extended through an intermediate range where the blocker 125 moves between the blocking and non-blocking positions, while contracting and urging the light blocker 125 toward either the blocking or non-blocking positions once the spring 137 transitions past the intermediate position.

The above spring action causes the blocker 125 to be operated in a tactile manner. More particularly, when the light path is closed by the blocker 125, the spring 137 is in a compressed and ‘short’ state. Upon the above described plunger/pusher 32 being inserted, the spring 137 starts to elongate and passes an intermediate or ‘midpoint’ at which it is most stretched. Subsequently, the spring 137 is now metastable and can urge the blocker 125 to gently ‘snap’ into the open position. The biasing element 136 of FIG. 12 will still urge the actuator upwards when the plunger 12 is removed thereby preventing the blocker 125 from always being in the open position. To return to the blocking or closed position, the spring 137 will again transition through the extended intermediate or midpoint after which the spring will gently ‘snap’ the blocker 125 back into the closed position.

Various forms of the food processing devices described above may have one or more of the following advantages. The arrangement of the interlock system described above may at least minimize the need for numerous moving mechanical parts, which are typical in mechanical safety interlock mechanisms, and which are more susceptible to failure over time. The use of the light channel, which allows for a path of light to travel from a light transmitter and a light sensor, does not rely on the use of complicated moving mechanical parts and linkages, and may thus provide a relatively simple alternative to traditional mechanical safety interlock systems for food processing devices. Accordingly, the arrangement of the interlock system may at least allow for a more robust and durable device that may also be more cost effective to maintain over time.

Although specific embodiments of the invention are illustrated and described herein, it will be appreciated by those of ordinary skill in the art that a variety of alternative and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms “comprise”, “comprising”, “include”, “including”, “contain”, “containing”, “have”, “having”, and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", etc. are used merely as labels, and are not intended to impose numerical requirements on or to establish a certain ranking of importance of their objects.

The invention claimed is:

1. A food processing device including:
- a base having a drive motor;
- a vessel removably mounted on the base and including a bottom wall, a side wall extending upwardly from the bottom wall to a cover member, the cover member including a feed tube extending upwardly therefrom;
- a pusher member adapted to be slidably received in the feed tube; and
- an interlock system operatively associated with the drive motor to enable operation of the drive motor, the interlock system including:
  - a light transmitter and a light sensor, the light transmitter being operable to provide a path of light that is receivable by the light sensor;
  - a light channel having an input end portion associated with the light transmitter and an output end portion associated with the light sensor to allow the path of light to travel therethrough; and
  - a light blocker located between the input and output end portions of the light channel, the light blocker being movable between:
    - a closed position wherein the light blocker blocks the path of light travelling from the light transmitter to the light sensor through the light channel, and
    - an open position wherein the light blocker is moved away from the path of light to permit the path of light from the light transmitter to the light sensor through the light channel such that the light sensor receives the path of light, thereby enabling operation of the drive motor, wherein the light blocker is movable to the open position by direct contact between the pusher member and the light blocker.

2. The food processing device of claim 1, wherein the light channel comprises:
- an input channel having a first end portion and a second end portion that is spaced from the first end portion, with the first end portion of the input channel providing the input end portion of the light channel; and
- an output channel having a first end portion and a second end portion that is spaced from the first end portion of the output channel, with the first end portion of the output channel being disposed adjacent the second end portion of the input channel, and the second end portion of the output channel providing the output end portion of the light channel.

3. The food processing device of claim 2, wherein the light blocker is located between the second end portion of the input channel and the first end portion of the output channel.

4. The food processing device of claim 1, wherein the light blocker is biased towards the closed position such that the path of light between the light transmitter and the light sensor is blocked in a resting state of the interlock system.

5. The food processing device of claim 1, further including a microprocessor that is operatively associated with the light sensor and the motor, wherein the microprocessor sends a signal to enable operation of the motor upon the light sensor detecting the path of light.

6. The food processing device of claim 1, wherein the cover member of the vessel comprises a lid that is removably coupled to a rim that is defined by the side wall of the vessel, with the rim surrounding a top opening of the vessel.

7. The food processing device of claim 1, wherein the light transmitter and the light sensor are each located adjacent the bottom wall of the vessel.

8. The food processing device of claim 7, wherein the light transmitter and the light sensor are each located on the base.

9. The food processing device of claim 7, wherein the light transmitter is located on the vessel and the light sensor is located on the base.

10. The food processing device of claim 9, wherein the light transmitter is inductively powered by an induction element located on the base.

11. The food processing device of claim 1, wherein the light channel extends along the side wall of the vessel.

12. The food processing device of claim 11, wherein the light channel extends along the side wall of the vessel and along a sidewall of the feed tube.

13. The food processing device of claim 1, wherein the vessel includes a handle, and the light channel extends along the handle of the vessel.

14. The food processing device of claim 1, wherein the light blocker is mounted to the feed tube.

15. The food processing device of claim 1, wherein the light blocker is mounted adjacent the cover member.

16. The food processing device of claim 1, wherein the feed tube includes a longitudinal slot, and the pusher member includes a body and a rail portion that extends along the body in a longitudinal direction, wherein the rail portion is adapted to be received by the longitudinal slot of the feed tube, and wherein the light blocker is movable to the open position by engagement of the rail portion of the pusher member with the longitudinal slot of the feed tube.

* * * * *